United States Patent [19]

Dasgupta et al.

[11] Patent Number: 5,437,692

[45] Date of Patent: Aug. 1, 1995

[54] METHOD FOR FORMING AN ELECTRODO-ELECTROLYTE ASSEMBLY

[76] Inventors: Sankar Dasgupta, c/o Electrofuels Manufacturing Co. 21 Hanna Ave., Toronto, Ontario, Canada, M6K 1W8; James K. Jacobs, c/o ELectrofuel Manufacturing Co. Unit 10, 21 Hanna Ave., Toronto, Canada, M6K 1W8

[21] Appl. No.: 332,796

[22] Filed: Nov. 2, 1994

[51] Int. Cl.⁶ .......................................... H01M 10/38
[52] U.S. Cl. .................... 29/623.1; 29/623.5; 429/192
[58] Field of Search ................ 29/623.1, 623.2, 623.3, 29/623.5; 429/192, 212

[56] References Cited

U.S. PATENT DOCUMENTS

| | | |
|---|---|---|
| 4,997,732 | 3/1991 | Austin et al. |
| 5,019,469 | 5/1991 | Muller. |
| 5,296,318 | 3/1994 | Gozdz et al. ........................ 429/192 |
| 5,314,507 | 5/1994 | Rossoll. |
| 5,328,779 | 7/1994 | Tannenbergen et al. |
| 5,340,670 | 8/1994 | Takami et al. ....................... 429/194 |

*Primary Examiner*—Anthony Skapars

[57] ABSTRACT

The non-aqueous thin film rechargeable lithium battery described has a negative electrode comprising a polymer laminate having embedded therein carbon, and a layer of fine carbon agglomerated with a lithium compound containing organic binder carried by the polymer laminate. The positive electrode of the rechargeable lithium battery contains a layer of fine particles of vanadium oxide, manganese oxide, cobalt oxide, nickel oxide or silver vanadate, agglomerated with a lithium compound containing organic binder and the layer is supported on another polymer laminate embedding carbon. In one embodiment the lithium battery has a solid polymer electrolyte containing a lithium compound capable of releasing lithium ions, located between the positive and negative electrodes. In another embodiment a microporous polymer laminate separator which has been impregnated with an organic liquid electrolyte containing a lithium compound, is placed between the polymer laminate negative electrode and the polymer laminate positive electrode. In both embodiments the electrodes are rendered adherent to the mobile lithium ion carrying electrolyte with a coating of an organic adhesive containing a lithium compound in a concentration lower than in the electrolyte, disposed between them.

32 Claims, 1 Drawing Sheet

METHOD FOR FORMING AN ELECTRODO-ELECTROLYTE ASSEMBLY

FIELD OF THE INVENTION

This invention is related to electro-chemical batteries, more particularly to lithium ion containing non-aqueous rechargeable batteries.

BACKGROUND TO THE INVENTION

The working of lithium batteries is based on the conversion to electrical energy of the chemical energy generated in forming lithium compounds from lithium atoms. The reactions for the formation of the lithium compounds may be reversed by feeding electrical energy to a lithium battery, in other words, most lithium batteries may be readily recharged. In conventional non-aqueous lithium batteries, the anodic reaction comprises lithium, often intercalated in fine particles of carbon, being ionized to form a mobile lithium ion accompanied by the generation of an electron. In the recharging step of the anode or the negative electrode, lithium atom is reformed by consuming an electron. The cathodic reaction of a lithium battery entails the formation of a lithium compound by reacting a lithium ion with another reagent and simultaneously consuming an electron. Conveniently, the other reagent is a metal oxide capable of forming an oxidic compound with lithium, such as for example a vanadium oxide homologue, manganese dioxide, cobalt oxide and such like. In the recharging step of the cathode, lithium ion is released from the oxidic compound formed in the discharging reaction, simultaneously generating an electron.

Thin film non-aqueous lithium batteries are made up by layers of organic polymer laminates, and each laminate carries substances taking part in the anodic and cathodic reactions, respectively. Thus the carbon particles having elemental lithium intercalated therein are carried by a laminate of an organic polymer, thereby forming an anodic or negative electrode laminate. The metal oxides which react with the lithium ions in the cathodic reaction are carried by another laminate of organic polymer, thereby forming a cathodic or positive electrode laminate. The negative and the positive electrode laminates are separated by another polymeric laminate which carries the non-aqueous electrolyte therein. The peripheries of the negative and positive electrode laminates are often also separated by a separator laminate which separate the electrode compartments without interfering with the reactions between the negative electrode and the electrolyte, and the positive electrode and the electrolyte during the operation of the battery. The laminates contained by the thin film battery are usually sealed by known methods and are also provided with metallic current collector sheets or foils for incorporation of the battery in an electrical circuit and for electrical contact during the charging and discharging of the battery.

Thin film lithium batteries render efficient service and prolonged useful life provided full contact is rigorously maintained between the respective laminates within the battery. If the contact area between the faces of the laminates in the battery is reduced during operation the energy output of the thin film lithium battery may be seriously impaired.

Another important requirement for efficient operation of a thin film non-aqueous lithium battery is that the anodic and cathodic reactions are separated, that is, no internal short circuiting takes place by means of electron flow between the anodic and the cathodic laminates located in the battery.

Yet another important feature of a well functioning non-aqueous lithium battery is efficient sealing, since any moisture entering the battery will react with the lithium present.

A method of spring-loading to maintain contact between the reactive compartments of a fuel cell battery is described in U.S. Pat. No. 5,328,779 issued on Jul. 12, 1994, to Tannenberger et al. U.S. Pat. No. 5,314,507 issued on May 24, 1994, to Rossol, teaches the use of high temperature-bonding adhesive seals between a ceramic frame and the metallic terminals within the cell. However, U.S. Pat. No. 5,314,507 does not address the problem of maintaining contact between reactive surfaces of the electrode and electrolyte laminates of a thin film non-aqueous lithium battery.

There is a need for a method to maintain contact between the interactive surfaces of the polymer laminates of a thin film non-aqueous lithium battery thereby enhancing prolonged and efficient battery life, and in another respect, there is a need for a method for more effectively separating the periphery of the polymer laminates which carry the electrodes of a thin film lithium battery, while maintaining the high mobility of the lithium ions traversing the non-aqueous electrolyte.

SUMMARY OF THE INVENTION

By one aspect of the invention a method is described for making an electrode-electrolyte assembly for incorporation in a lithium battery. One of the electrode-electrolyte assemblies described comprises a negative electrode made of a continuous layer of fine carbon particles having been agglomerated with a lithium compound containing organic binder and carried by a water impervious, electron-permeable polymer laminate having parallel faces. The particles of fine carbon forming the layer, are capable of intercalating lithium. The solid polymer electrolyte of the electrode-electrolyte assembly is made of a second polymer laminate having parallel faces, in which a lithium compound capable of releasing mobile lithium ions has been dissolved in a first concentration. The lithium ion containing second polymer laminate is non-conductive of electrons and conductive of lithium ions. A lithium compound is dissolved in a second concentration in a fluid adhesive mixture, and the lithium ion containing fluid adhesive mixture is disposed; to provide a coating on at least a portion of one of the parallel faces of the lithium ion containing solid polymer electrolyte. The second concentration of the lithium compound is less than the first concentration in which the lithium compound is contained in the second polymer laminate. The continuous layer of carbon particles agglomerated with a lithium compound containing organic binder comprised in the negative electrode is brought into contact with the lithium ion containing adhesive coating disposed on one of the parallel faces of the lithium ion-conductive solid polymer electrolyte, for providing a lithium containing electrode-electrolyte assembly adherent to one another. In another electrode-electrolyte assembly a positive electrode is provided, which comprises a continuous layer of fine particles of an oxide capable of incorporating lithium in its structure, agglomerated with a lithium compound containing organic binder. The continuous layer of agglomerated fine particles of the oxide, which is selected from the group consisting of vanadium oxide, manganese oxide, cobalt oxide, nickel oxide and silver-vanadium oxide, is carried on one of the parallel faces of another water impervious, electron-permeable polymer laminate. The positive electrode-electrolyte assembly further comprises a solid polymer electrolyte containing an ionizable lithium compound dissolved therein in a first concentration, and a lithium ion containing fluid adhesive coating, containing a lithium compound in a second concentration, disposed between opposing faces of the positive electrode comprising a continuous layer of agglomerated fine particles of an oxide, and the lithium ion-conductive solid polymer electrolyte. The second concentration of the lithium compound is less than the first concentration.

By another aspect of the present invention, the solid polymer electrolyte in the electrode-electrolyte assembly is replaced by a microporous polymer laminate separator having parallel faces, which has been impregnated with a lithium compound containing organic liquid, in an area corresponding to the continuous layer of agglomerated fine particles of an oxide or carbon comprised by the positive or negative electrode, respectively. The lithium ion containing fluid adhesive coating is disposed on the parallel faces of the impregnated microporous polymer laminate separator. Each of the lithium ion containing adhesive-coated faces of the impregnated microporous laminate separator is brought into contact with the respective continuous layer of agglomerated particles comprised in the positive or the negative electrode, to form an adherent electrode-electrolyte assembly.

Figure 1A:
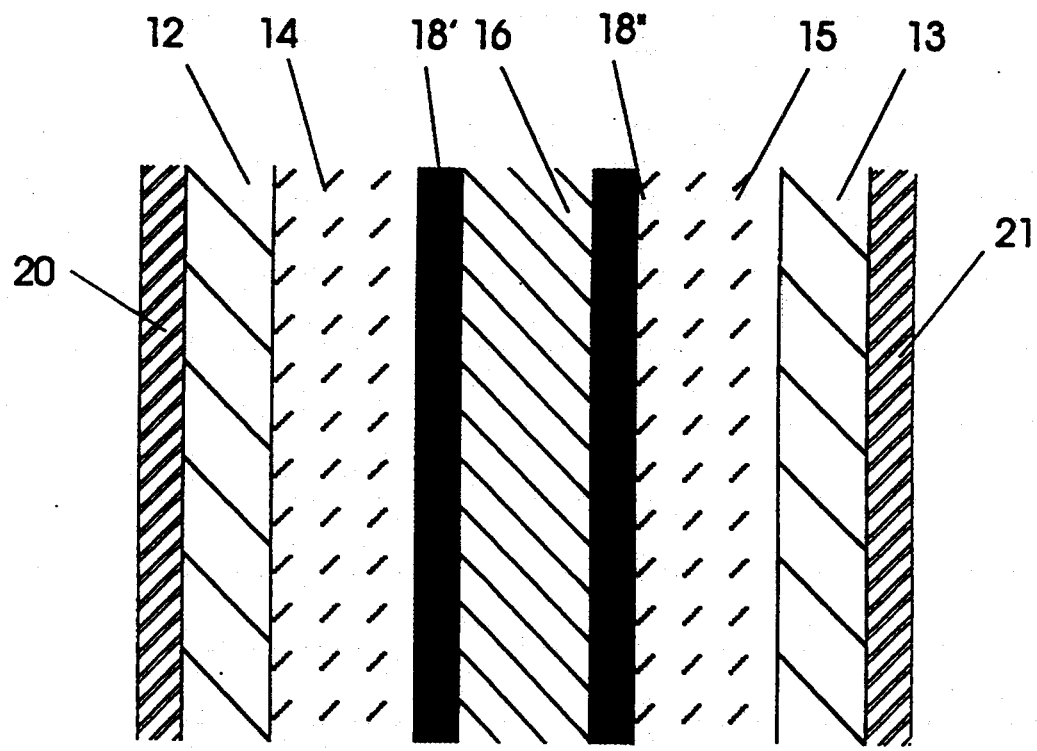
FIG. 1a is a schematic diagram of a lithium battery assembled according to the method of this invention, incorporating a solid polymer laminate electrolyte having a lithium compound dissolved therein.

The preferred embodiments of the invention will be described hereinbelow and illustrated by the Figures and working examples.

DETAILED DISCUSSION OF THE PREFERRED EMBODIMENTS

As briefly discussed hereinabove, conventional non-aqueous, thin film lithium batteries comprise lithium containing positive and negative electrode laminates and a lithium ion containing non-aqueous electrolyte bearing laminate sandwiched between the electrode laminates. The cathodic reagents are incorporated in the positive electrode laminate, and the anodic reagents are provided within the negative electrode laminate. The electrode-electrolyte-electrode assembly is usually placed between metallic current collector means to allow charging and discharging the battery, and the complete assembly is sealed in a battery housing.

The electrodes of the thin film non-aqueous lithium batteries comprise elemental lithium intercalated in fine carbon particles and fine particles of a metal oxide capable of incorporating lithium ions in its structure. The metal oxide is usually a transition metal oxide which can form an oxidic compound with lithium. The commonly used transition metal oxides include vanadium oxide homologues, such that may be denoted by the general formula: $V_nO_{2n+1}$ where n is greater than 1, manganese dioxide, higher oxides of cobalt and nickel, silver-vanadium oxide and similar oxides capable of forming reversibly oxidic compounds with lithium. The above electrode substances are agglomerated with a non-aqueous organic binder, and the obtained agglomerated mixture made to form a layer which is to be incorporated in a thin film lithium battery.

It has now been found that if a lithium compound, in particular a lithium compound capable of dissociating into a lithium ion in an organic medium, is dissolved in the organic binder used in the agglomeration, then the mobility of the lithium ion passing in or out of the fine carbon particles in the charging and discharching step of the negative electrode, is greatly enhanced. Similarly, a lithium compound capable of dissociating into lithium ion, dissolved in the organic binder agglomerating the metal oxide particles, has been found to increase the mobility of lithium ions in the positive electrode. Thus the anodic and cathodic reagents utilized in the present invention, are agglomerated with a commercially available organic binder such as ethylene carbonate, propylene carbonate or mixtures thereof, in which a lithium compound capable of releasing a lithium ion by chemical dissociation has been dissolved. The commonly used lithium compounds include lithium triflate $LiCF_3SO_3$, lithium perchlorate $LiClO_4$, lithium borofluoride $LiBF_6$, lithium phosphofluoride $LiPF_6$, lithium arsenofluoride $LiAsF_6$ and such like.

The concentration of the lithium compound in the binder is not critical but advantageously it is between 0.3 Molar and saturation in the organic binder.

The amount of binder added to the fine carbon and the particles of the oxide, respectively, to make up the electrodes, will depend on the particle size of the anodic and cathodic reagents, but conveniently it is between 5 to 15 vol. %.

As has been discussed hereinabove, lithium and its compounds readily react with moisture, thereby the efficacy of the lithium ion containing electrode may be substantially reduced. It is therefor of importance that access of moisture to the electrodes of a non-aqueous lithium battery is restricted or if possible, eliminated. On the other hand, the electrodes need to be electrically accessible for satisfactory operation of the battery. It has been found that a polymeric laminate, such as for example, polyethylene or polypropylene sheets which have a substance that is conductive of electrons embedded therein, can serve both as a sealing medium and a charge collector in a non-aqueous thin film lithium battery. Our application, bearing U.S. Ser. No. 08/204,439, filed on Mar. 2, 1994, describes a polymeric current or charge collector which has fine carbon particles or particles of an electrically conducting inorganic compound, such as titanium nitride, embedded therein. Preferably the electrically, or more specifically, electronically conducting particles, such as carbon particles, are embedded in the polymer laminate in such manner that the particles are not completely enclosed within the polymer laminate and some of the particles stick out above the surface of the laminate. In other words, the top portion of some of the carbon particles is raised above the surface of the laminate. Thus electrons may enter into or leave the laminate from another surface which is in contact with the carbon embedded in the polymer laminate, thereby rendering the polymer laminate permeable to electrons but impervious to water.

In the preferred embodiment of the present invention the fine carbon particles agglomerated with an organic binder that has a lithium compound dissolved in it, are made into a continuous layer carried by one of the faces of the above described polymer laminate permeable to electrons. The particle size of the carbon in the agglomerated layer is preferably less than one micron. The thickness of the continuous agglomerated carbon layer is conveniently between 0.5 and 1.5 mm. Any conventional method, such as for example, the doctor's blade method, may be used to obtain a continuous layer of substantially uniform thickness. The continuous layer of agglomerated fine carbon containing a suitable lithium compound, carried on one of the faces of the water impervious and electron permeable polymer laminate comprises the negative electrode of the thin film non-aqueous lithium battery.

The positive electrode of the thin film non-aqueous lithium battery comprises a continuous layer of fine oxide particles which have been agglomerated with a lithium compound containing organic binder. The continuous layer of agglomerated oxide particles is carried on one of the faces of another water impervious and electron permeable polymer laminate, and together they make up the positive electrode. The thickness of the agglomerated layer is in excess of 0.5 mm.

A solid polymer electrolyte containing a lithium compound which is capable of releasing a mobile lithium ion by means of chemical dissociation, is placed between the continuous layer of agglomerated fine carbon particles comprised in the negative electrode and the continuous layer of agglomerated fine particles of oxide.

For the sake of clarity, a solid polymer electrolyte of a battery is conductive of ions, in the present battery specifically of lithium ions. A solid polymer electrolyte is usually non-conductive of electrons.

The polymer laminate is made of a known substance such as polyethylene-oxide or a compound based on polyethylene-oxide, polypropylene-oxide or a compound based on polypropylene-oxide, polyether based compounds, polyether derivatives copolymerized with a di-epoxy-compound, poly(vinyledene fluoride) containing compounds, poly(epichlohydrine) containing compounds or even elastomerized organic polymers incorporating fine particles of zeolites for strength. Polyethylene-oxide is also known as poly-oxy-ethylene and polypropylene-oxide as poly-oxy-propylene. Generally, any polymer substance in which a lithium compound capable of producing mobile lithium ions by dissociation is soluble, may be laminated and is not conductive of electrons, may serve as a solid polymer electrolyte.

The lithium compound dissolved in the solid polymer laminate electrolyte of the present thin film non-aqueous lithium battery may be any compound that is able to release lithium ions by means of chemical dissociation. Such lithium compounds include lithium triflate, lithium borofluoride, lithium phosphofluoride, lithium arsenofluoride, lithium perchlorate, an organic polymer having lithium chemically bonded in it such that the lithium may dissociate as lithium ion, or such like. The concentration of the lithium compound in the solid polymer is such that the concentration of lithium ions formed is high, but conveniently it is between 0.8 and 2 Molar. The thickness of the polymer laminate in which the lithium compound is dissolved is dictated by convenience, but is usually higher than 0.1 mm.

The novel feature of the thin film non-aqueous battery of the present invention is that a lithium ion containing adhesive layer or coating is located between the respective continuous layer of agglomerated fine carbon or agglomerated fine particles of an oxide, and the lithium ion-conductive solid polymer laminate electrolyte. The adhesive coating is made up of an organic polymer in which a lithium compound capable of releasing mobile lithium ions has been dissolved, dispersed in an organic adhesive compound. The organic polymer in the adhesive mixture is conveniently one of ethylene-propylene diamine monomer, poly(vinyledene fluoride), polyethylene-oxide, polypropylene-oxide or a similar polymeric compound. The lithium compound dissolved therein may be lithium triflate, lithium perchlorate, lithium borofluoride, lithium phosphofluoride, lithium arsenofluoride or a lithium compound of similar nature. The adhesive compound serving as organic base substance is conveniently ethylene carbonate, propylene carbonate or a mixture therof. The obtained lithium ion containing fluid adhesive mixture is preferably deployed on at least a portion of the solid polymer laminate electrolyte, thereby obtaining a lithium ion containing adhesive coating. The lithium ion containing adhesive coating is subsequently brought into contact with either the continuous layer of agglomerated, lithium containing fine carbon comprised in the negative electrode, or the continuous layer of agglomerated, lithium containing fine particles of oxide comprised in the positive electrode.

The concentration of the lithium compound in the adhesive coating is lower than the concentration of the lithium compound in the solid polymer laminate electrolyte, and it is usually less than 1 Molar.

The above described method will result in positive electrode-solid polymer laminate electrolyte and negative electrode-solid polymer laminate electrolyte subassemblies in which the electrode layer is strongly adherent to the lithium ion-conductive solid polymer electrolyte. The lithium ion concentration gradient in the lithium battery of the present invention will enhance the mobility of lithium ions within the battery, and drive the lithium ions in greater numbers towards the electrodes.

It is to be noted that the above described concentrations apply to initial conditions in the lithium battery, that may change during the operation of the battery.

Preferably the same lithium compound capable of releasing mobile lithium ions, is used in the organic binder, in the adhesive coating and in the solid polymer laminate elctrolyte, but this is not a prerequisite of the workability of the invention.

The first embodiment of the thin film non-aqueous lithium battery will thus be constructed of a negative electrode comprised of a continuous layer of agglomerated fine carbon particles also containing lithium, and carried on one of the faces of a water impervious, electron permeable polymer laminate, a lithium ion-conductive solid polymer laminate electrolyte, and a positive electrode comprising a continuous layer of agglomerated fine particles of an oxide also containing lithium, and carried on one of the faces of another water impervious, electron permeable polymer laminate. Between each of the respective continuous agglomerated layers of the electrodes and the appropriate face of the solid polymer laminate electrolyte is disposed a lithium ion containing adhesive coating.

Metallic current collectors contacting the respective external faces of the electron permeable polymer laminate and having electrical lead wires, enable the lithium battery made as described hereinabove to be included in an electrical circuitry. The metallic current collectors may be sheets or foils made of copper, nickel aluminum or alloy thereof.

So that internal short circuiting of the lithium battery is avoided, a conventional separator sheet is incorporated in the lithium battery between the current collectors and portions of the electrodes in a known manner. It is to be noted that the manner the separator is disposed or located within the battery utilizing a solid polymer laminate electrolyte is beyond the scope of the present invention. The lithium battery is also sealed by conventional and known methods, and is packaged by means of conventional battery housing devices.

The separator layer utilized in a lithium battery is usually strong and is able to withstand mechanical wear. Separator polymer laminates are not conductive of ions nor of electrons. On the other hand, solid polymer substances utilized for dissolving lithium compounds and forming solid polymer laminate electrolytes are usually less strong and less resistant to mechanical damage. In the second embodiment of the present invention the solid polymer lithium-containing electrolyte is replaced by a microporous polymer laminate separator impregnated with an organic liquid in which a lithium compound capable of releasing mobile lithium ions has been dissolved. It has been found that a microporous polymer laminate separator impregnated with a lithium ion containing organic liquid combines the desirable higher mechanical strength with the high mobility of lithium ion contained in a liquid.

In the second embodiment a microporous polymer laminate separator which has two parallel faces is utilized. The micropores of the polymer laminate separator are impregnated in an area that substantially corresponds to the size of the continuous agglomerated layers comprised in the electrodes. The unimpregnated portions of the microporous polymer laminate separator usually extend beyond the continuous agglomerated layer containing lithium and fine carbon or fine particles of an oxide. That is, the dimensions of the mircroporous polymer laminate usually overlap the dimensions of the electrodes by a fraction of an inch. The size of the overlap is dictated by convenience and usually ranges between 0.1 to 0.5 inches, thus the portions which have not been impregnated with the non-aqueous organic liquid electrolyte and extend beyond the electrodes are effective in ensuring that there is no short-circuiting between the electrodes and there is no electrical contact between the metallic current collectors located within the battery.

The organic liquid for impregnating the microporous polymer laminate separator is selected according to the following aspects:

(i) the organic liquid is to have substantial solubility for the lithium compound which is to be dissolved in it. The lithium compound dissolved in the liquid is one that can release mobile lithium ions by chemical dissociation;

(ii) the organic liquid has to be compatible with the substance of which the mircroporous polymer laminate separator is made, that is, it has to wet the polymer laminate separator but must not dissolve it or react with it in any way;

(iii) the organic liquid needs to be sufficiently viscous to be retained in the micropores of the laminate but not too viscous for obvious reasons.

The microporous polymer laminate separator is preferably manufactured from polyethylene or polypropylene, but other similar polymer substance that is strong, tough, relatively inert and can be manufactured to have micropores, may be used.

It has been found that ethylene carbonate, propylene carbonate or mixtures thereof, are suitable organic liquids for use in the impregnation of the microporous polymer laminate.

Suitable lithium compounds are those used in the organic binder for agglomerating the electrodes, and also utilized in the fluid adhesive mixture, thus they include lithium triflate, lithium borofluoride, lithium phpsphofluoride, lithium arsenofluoride, lithium perchlorate and similar lithium compounds. The lithium compound is dissolved in the organic liquid in a concentration less than 2 Molar. Depending on the micropore concentration in the laminate, the organic liquid preferably takes up between 10 to 20 vol. % of the microporous polymer laminate separator.

The impregnated microporous polymer laminate separator cut to the required size is incorporated in the thin film non-aqueous lithium battery in the same manner as it has been described in the first embodiment, replacing the lithium ion-conductive solid polymer laminate electrolyte. The positive electrode-electrolyte and negative electrode-electrolyte assemblies are also made up by the same process steps as applied in making up the electrode-electrolyte assemblies in accordance with the first embodiment.

The thin film non-aqueous lithium battery as described in the second embodiment of the invention, is compiled as follows: the microporous polymer laminate separator impregnated with a lithium compound containing organic liquid, bearing at least on a portion of each of its faces a coating of the lithium ion containing fluid adhesive mixture, is placed between the continuous layer of agglomerated fine carbon containing lithium comprised in the negative electrode and the continuous layer of agglomerated fine particles of an oxide also containing lithium, comprised in the positive electrode. The external faces of the electron permeable polymer laminates comprised in the electrodes are subsequently enclosed between metallic current collectors. The metallic current collectors are made of copper, nickel, aluminum or alloys thereof. The metallic current collectors carry external electrical leads. The lithium battery is sealed by conventional methods and housed in conventional lithium battery housing. The concentration of the lithium compound dissolved in the organic liquid impregnating the microporous polymer laminate separator is higher than the concentration of the lithium compound which has been dissolved in the fluid adhesive mixture utilized in the adhesive coatings. Conveniently the same lithium compound is utilized in the lithium ion containing adhesive coating as is dissolved in the organic liquid impregnating the micropores of the microporous polymer laminate separator, however, this is not mandatory.

The thin film non-aqueous lithium battery of both embodiments of this invention may also be constructed of two half-cells, that is by the utilization of a positive electrode-electrolyte and a negative electrode-electrolyte assembly. The assemblies are joined by bringing into contact with one another the uncoated free faces of the lithium ion-conductive solid polymer laminate electrolyte or the microporous polymer laminate separator impregnated with a lithium compound containing organic liquid. If so desired, a coating of the lithium ion containing fluid adhesive mixture may be placed on one of the free faces of either the solid polymer laminate electrolyte or the microporous polymer laminate separator.

In another variation of both the first and second embodiments of this invention, the adhesive coating may be applied to each of the continuous agglomerated layers comprised in the negative and positive electrodes, as well as on the face of the lithium ion conductive solid polymer laminate electrolyte, or as the case may be, the impregnated area of the microporous laminate separator.

Optionally, the particles of fine carbon or the fine particles of the oxide, agglomerated with a lithium containing organic binder may also be embedded in yet another polymer laminate, in such manner that the agglomerated particles are incompletely covered by the polymer laminate. This latter polymer laminate would replace the continuous layer of agglomerated particles in the electrodes.

EXAMPLE 1

Commercially available untreated fine carbon particles were embedded in a 0.4 mm thick commercially available laminated polyethylene sheet in such a manner that a portion of the agglomerated carbon particles was protruding out of each face of the polyethylene laminate. In other words, the carbon particles were not completely coated and enclosed by the polyethylene laminate, and thus the embedded agglomerated carbon particles could come into direct contact with a metallic current collector or a lithium containing liquid or solid electrolyte, on either of the faces of the laminate. Subsequently, commercially available fine carbon having particle size less than a micron ($\mu$m), was agglomerated with a lithium compound containing organic binder. The organic binder was a 1:1 mixture of ethylene carbonate and propylene carbonate, containing lithium phosphofluoride $LiPF_6$, in 0.4 Molar concentration. Some acetone was added to the ethylene carbonate-propylene carbonate mixture to render it more fluid. The binder mixture was added to the fine carbon in 12 vol. % and thoroughly mixed with it. The rather tacky paste of the agglomerated fine carbon particles was subsequently applied as a continuous adherent layer to one face of the untreated carbon-embedding, electron permeable polyethylene laminate and the acetone was then allowed to evaporate. The thickness of carbon layer on the polymer laminate was adjusted to 0.9 mm by conventional doctor's blade method. The obtained electron permeable polymer laminate having the layer of lithium containing agglomerated carbon on one of its faces was to be used as the negative electrode in a lithium battery.

Commercially available fine particles of orthorhombic manganese dioxide, having particle size of 7–15 $\mu$m, were agglomerated as described above with 12 vol. % 1:1 ethylene carbonate-propylene carbonate mixture containing $LiPF_6$ in 0.4M concentration. The mixture of agglomerated $MnO_2$ particles was applied as a layer to another carbon-embedding electron permeable polyethylene laminate of 0.4 mm thickness. The thickness of the layer containing agglomerated $MnO_2$ and $LiPF_6$ was adjusted to 1 mm by doctor's blade method. The obtained agglomerated $MnO_2$ and lithium compound containing continuous layer carried by the polyethylene laminate was to be used as the positive electrode in a lithium battery.

$LiPF_6$ was dissolved in polyethylene-oxide in a known manner to have 1.5 Molar concentration, and the polymeric mixture was subsequently laminated to have 0.2 mm thickness.

The lithium containing positive, negative electrode laminates and solid polymer electrolyte laminate were cut to 2"×3" sized pieces.

Ethylene-propylene diamine monomer was dissolved in acetone as a solvent, to obtain a relatively thick solution, and $LiPF_6$ was added to the solution in 0.5 Molar concentration based on the solid content of the ethylene-propylene diamine monomer solution. The $LiPF_6$ containing ethylene-propylene diamine monomer was dispersed in ethylene carbonate-propylene carbonate mixed in 1:1 ratio, so that the ethylene-propylene diamine monomer:ethylene carbonate-propylene carbonate ratio was 100:20 in the mixture. Each face of the laminates made of lithium ion containing polyethylene-oxide was coated with this solution in a thin layer, thereby obtaining a lithium containing and lithium ion-conductive adhesive coating on each face. Subsequently, the acetone in the mixture was allowed to completely evaporate leaving a tacky coating on the faces of the polyethylene-oxide based solid polymer laminate electrolyte.

The agglomerated fine carbon and $LiPF_6$ containing continuous layer of the negative electrode was then brought into contact with one of the faces of the same sized, $LiPF_6$ containing adhesive coated solid polymer laminate electrolyte, which also contained $LiPF_6$ but in a higher concentration. The other face of the $LiPF_6$ containing polyethylene-oxide based solid polymer electrolyte coated with the adhesive mixture containing $LiPF_6$, was brought into contact with the positive electrode carrying the continuous layer made of agglomerated particles of $MnO_2$ and $LiPF_6$ dissolved in the organic binder. The laminates were found to adhere strongly to one another.

A copper foil was placed on the free and uncoated face of the polyethylene laminate incorporated in the negative electrode and an aluminum foil was placed on the corresponding free face of the positive electrode, to serve as metallic current collectors. Each current collector had an electrical lead wire attached to it. The adherent laminates sandwiched between the metallic current collectors were then sealed and enclosed in a battery housing in a known manner, together with a conventional separator sheet within the housing between the current collectors and the perimeters of the negative and positive electrodes.

FIG. 1a provides a schematic presentation of the cross-section of the lithium battery obtained as described above, wherein 12 represents the untreated carbon-embedding electron permeable polymer laminate, which is carrying the lithium compound containing agglomerated fine carbon layer 14. Together 12 and 14 form the negative electrode. The untreated carbon-embedding electron permeable polymer laminate 13, having a thick layer 15, of manganese dioxide agglomerated with a lithium compound containing organic binder make up the positive electrode. 16 represents the lithium ion-conductive solid polymer laminate electrolyte. 18' and 18" represent the adhesive coatings containing a lithium compound in a concentration lower than that in the lithium ion-conductive solid polymer laminate electrolyte, located between the solid polymer laminate electrolyte and the respective agglomerated layers of the laminate electrodes. The copper and aluminum current collector foils are represented by 20 and 21, respectively. Each metallic current collector is in direct contact with the electrode.

The thin film non-aqueous lithium battery made as described above, was charged by applying 4.2 volts direct potential to the electrodes by means of the current collector leads. The potential was applied until the battery was fully charged. The fully charged lithium battery was capable of delivering a steady potential of 3.4 volts.

The thin film non-aqueous lithium battery made according to the present invention was subjected to 100 charging-discharging cycles without detriment to its performance.

EXAMPLE 2

A negative electrode consisting of carbon-embedding electron permeable polyethylene laminate bearing a continuous layer of agglomerated fine carbon, was made as in Example 1. In this instance, the organic binder was mixed to have lithium perchlorate in 0.4 Molar concentration. The positive electrode was prepared by similar steps, however, the agglomerated cathodic reagent carried as a continuous layer on one face of the electron permeable polyethylene laminate was agglomerated cobalt oxide, having particle size between 7 and 15 μm. The process steps of the agglomeration of the cobalt oxide particles by an organic lithium containing binder was same as in Example 1. As in Example 1, the organic binder was ethylene carbonate-propylene carbonate, however, the lithium compound utilized was lithium perchlorate, ($LiClO_4$).

The lithium ion carrying microporous polymer laminate separator was prepared by impregnating by means of usual methods microporous polyethylene sheets marketed under the name of "Celgard", with $LiClO_4$ dissolved in ethylene carbonate-propylene carbonate mixed in 1:1 ratio. The $LiClO_4$ concentration in the solution was 1.6 Molar. The impregnated areas of the microporous polymer separator corresponded to the area of the continuous layers of agglomerated carbon-lithium perchlorate of the negative electrode on the one hand, and agglomerated cobalt oxide-lithium perchlorate of the positive electrode on the other hand. Unimpregnated microporous polymer laminate separator framed the impregnated areas in about 0.5" on all four of the sides of the impregnated area.

The fluid mixture for the adhesive coating was prepared from ethylene-propylene diamine monomer diluted with acetone and $LiClO_4$, dispersed in a 1:1 mixture of ethylene carbonate-propylene carbonate. The $LiClO_4$ had 0.5 Molar concentration based on the polymer content of the mixture. The fluid adhesive mixture, containing $LiClO_4$ in a concentration lower than that in the organic liquid impregnating the microporous polymer laminate separator, was applied to each one of the faces of the impregnated area of the microporous polymer laminate separator, and subsequently, the acetone therein was allowed to evaporate. The adhesive mixture-coated impregnated areas of the microporous polymer laminate separator were placed between the faces of the respective agglomerated layers carried by the carbon-embedding electron permeable polyethylene laminates making up the electrodes.

Figure 1B:
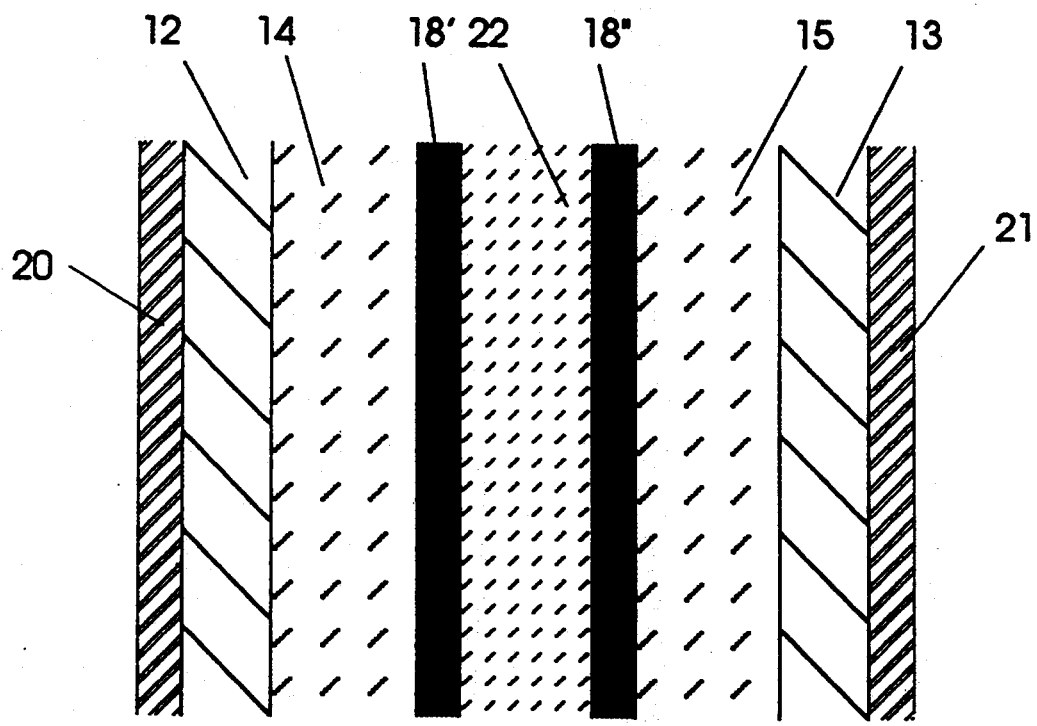
FIG. 1b is a schematic diagram of a lithium battery assembled according to the present invention, containing a microporous polymer laminate separator which has been impregnated with an organic liquid containing a lithium compound.

FIG. 1b shows schematically the cross-section of the thin film non-aqueous lithium battery made in accordance with the second embodiment of the present invention. Like numerals represent like parts of FIG. 1a. The microporous polymer laminate separator impregnated with a $LiClO_4$ containing organic solution, 22, is located between the layers of lithium compound containing agglomerated particles, 14 and 15, carried by the carbon-bearing polyethylene laminates 12 and 13. The impregnated microporous laminate separator is coated on each of its faces with $LiClO_4$ containing adhesive coatings 18' and 18".

Copper and aluminum foils having electrical leads, were brought in contact with the uncoated faces of the electron permeable polyethylene laminate comprised in the electrodes and the lithium battery composed of laminates assembled as described above was sealed in a battery housing in the conventional manner.

The thin film non-aqueous lithium battery was subsequently charged by applying 4.2 volts direct potential between the current collectors until it was fully charged. The fully charged battery exhibited a power of 3.4 volts. The lithium battery was subjected to 100 discharging and charging cycles without detriment to its performance.

The new method for making a rechargeable non-aqueous thin film lithium battery in accordance with the present invention combines three separate advantageous features:

1. it utilizes a lithium compound containing and lithium ion permeable organic binder for agglomerating the particles making up the negative and positive electrodes, respectively, thereby enhancing the mobility of the lithium ion in the electrodes;
2. in one embodiment it utilizes a lithium ion-conductive solid polymer laminate electrolyte in which a lithium compound has been dissolved, and in another embodiment it utilizes a microporous polymer laminate separator impregnated with an organic liquid containing a lithium compound. The microporous polymer laminate separator combines the toughness of a polymer separator laminate with the high mobility of lithium ions dissolved in a liquid; and
3. it provides a lithium ion containing and lithium ion permeable adhesive coating between the electrolyte and the electrode, which thereby leads to strongly adherent laminate layers within the rechargeable battery.

The above features will result in reliable battery performance and prolonged battery life.

Although the present invention has been described with reference to the preferred embodiments, it is to be understood that modifications and variations may be resorted to without departing from the spirit and scope of the invention, as those skilled in the art will radily understand. Such modifications and variations are considered to be within the perview and scope of the invention and the appended claims.

We claim:
1. A method for forming an electrode-electrolyte assembly for incorporation in a rechargeable lithium battery, comprising the steps of:
   i) providing a first polymer laminate having embedded therein an electronically conductive carbonaceous substance, said first polymer laminate having parallel faces and being impervious to water, said first polymer laminate being permeable to electrons;

ii) agglomerating particles of fine carbon capable of intercalating lithium, with a lithium compound containing organic binder, and providing a continuous layer of the agglomerated particles of fine carbon so obtained on one of said parallel faces of said first polymer laminate, said continuous layer having thickness in excess of 0.5 mm, thereby forming a lithium containing negative electrode;

iii) providing a second polymer laminate having parallel faces, said second polymer laminate being non-conductive of electrons, said second polymer laminate having a lithium compound dissolved therein in a first concentration, said lithium compound being capable of releasing mobile lithium ions, thereby forming a lithium ion-conductive solid polymer laminate electrolyte;

iv) providing a lithium ion containing fluid adhesive mixture and disposing said fluid adhesive mixture to form a lithium ion containing adhesive coating on at least a portion of one of the parallel faces of said lithium ion-conductive solid polymer laminate electrolyte, said fluid adhesive mixture containing a lithium compound in a second concentration, said second lithium compound concentration being less than said first lithium compound concentration; and v) bringing into contact said lithium ion containing adhesive coating disposed on one of said parallel faces of said lithium ion-conductive solid polymer laminate electrolyte with said continuous layer of fine carbon agglomerated with a lithium compound containing organic binder located on one of said parallel faces of said first polymer laminate comprised in said lithium bearing negative electrode, thereby forming a lithium containing electrode-electrolyte assembly adherent to one another.

2. A method for forming an electrode-electrolyte assembly for incorporation in a rechargeable lithium battery compring the steps of:

i) providing a first polymer laminate having embedded therein an electronically conductive carbonaceous substance, said first polymer laminate having parallel faces and being impervious to water, said first polymer laminate being permeable to electrons;

ii) agglomerating fine particles of an oxide capable of incorporating lithium, with a lithium compound containing organic binder, said oxide being selected from the group consisting of vanadium oxide, manganese oxide, cobalt oxide, nickel oxide and silver-vanadium oxide, and providing a continuous layer of the agglomerated fine particles of oxide so obtained on one of said parallel faces of said first polymer laminate, said continuous layer having thickness in excess of 0.5 mm, thereby forming a lithium containing positive electrode;

iii) providing a second polymer laminate having parallel faces, said second polymer laminate being non-conductive of electrons, said second polymer laminate having a lithium compound dissolved therein in a first concentration, said lithium compound being capable of releasing mobile lithium ions, thereby forming a lithium ion-conductive solid polymer laminate electrolyte;

iv) providing a lithium ion containing fluid adhesive mixture and disposing said fluid adhesive mixture to form a lithium ion containing adhesive coating on at least a portion of one of the parallel faces of said lithium ion-conductive solid polymer laminate electrolyte, said fluid adhesive mixture containing a lithium compound in a second concentration, said second lithium compound concentration being less than said first lithium compound concentration; and v) bringing into contact said lithium ion containing adhesive coating disposed on one of said parallel faces of said lithium ion-conductive solid polymer laminate electrolyte with said continuous layer of fine particles of said oxide agglomerated with a lithium compound containing organic binder located on one of said parallel faces of said first polymer laminate comprised in said lithium containing positive electrode, thereby forming a lithium containing electrode-electrolyte assembly adherent to one another.

3. A method for forming an electrode-electrolyte assembly for incorporation in a rechargeable lithium battery as claimed in claim 1, wherein said second polymer laminate comprises a polymeric compound selected from the group consisting of a polyether derivative copolymerized with a di-epoxy compound, a polyethylene-oxide based compound, a polypropylene-oxide based compound, a polyether-based polymer, a poly(epichlorhydrine) derivative containing compound, a poly(vinylidene fluoride) containing compound and an elastomerized organic polymer incorporating fine particles of a zeolitic substance.

4. A method for forming an electrode-electrolyte assembly for incorporation in a rechargeable lithium battery as claimed in claim 2, wherein said second polymer laminate comprises a polymeric compound selected from the group consisting of a polyether derivative copolymerized with a di-epoxy compound, a polyethylene-oxide based compound, a polypropylene-oxide based compound, a polyether-based polymer, a poly(epichlorhydrine) derivative containing compound, a poly(vinylidene fluoride) containing compound and an elastomerized organic polymer incorporating fine particles of a zeolitic substance.

5. A method for forming an electrode-electrolyte assembly for incorporation in a rechargeable lithium battery as claimed in claim 1, wherein said lithium compound dissolved in said second polymer laminate in said first concentration is selected from the group consisting of lithium triflate, lithium perchlorate, lithium borofluoride, lithium phosphofluoride, lithium arsenofluoride and a lithium compound capable of releasing mobile lithium ions chemically bonded to a solid organic polymer.

6. A method for forming an electrode-electrolyte assembly for incorporation in a rechargeable lithium battery as claimed in claim 2, wherein said lithium compound dissolved in said second polymer laminate in said first concentration is selected from the group consisting of lithium triflate, lithium perchlorate, lithium borofluoride, lithium phosphofluoride, lithium arsenofluoride and a lithium compound capable of releasing mobile lithium ions chemically bonded to a solid organic polymer.

7. A method for forming an electrode-electrolyte assembly for incorporation in a rechargeable lithium battery as claimed in claim 5, wherein said first concentration of said lithium compound in said second polymer laminate is less than 2 Molar.

8. A method for forming an electrode-electrolyte assembly for incorporation in a rechargeable lithium battery as claimed in claim 6, wherein said first concentration of said lithium compound in said second polymer laminate is less than 2 Molar.

9. A method for forming an electrode-electrolyte assembly for incorporation in a rechargeable lithium battery as claimed in claim 1, wherein said lithium ion containing adhesive coating is disposed on the entire face of one of said parallel faces of said lithium ion-conductive solid polymer laminate electrolyte.

10. A method for forming an electrode-electrolyte assembly for incorporation in a rechargeable lithium battery as claimed in claim 2, wherein said lithium ion containing adhesive coating is disposed on the entire face of one of said parallel faces of said lithium ion-conductive solid polymer laminate electrolyte.

11. A method for forming an electrode-electrolyte assembly for incorporation in a rechargeable lithium battery as claimed in claim 1, wherein said lithium ion containing fluid adhesive mixture comprises an organic polymer selected from the group consisting of ethylene propylene-diamine monomer, poly(vinyledene fluoride), polyethylene-oxide and polypropylene-oxide, a lithium compound selected from the group consisting of lithium triflate, lithium perchlorate, lithium borofluoride, lithium arsenofluoride and lithium phosphofluoride, said organic polymer and said lithium compound being dispersed in a matrix selected from the group consisting of ethylene carbonate, propylene carbonate and mixtures thereof, said lithium compound being present in said second concentration.

12. A method for forming an electrode-electrolyte assembly for incorporation in a rechargeable lithium battery as claimed in claim 2, wherein said lithium ion containing fluid adhesive mixture comprises an organic polymer selected from the group consisting of ethylene propylene-diamine monomer, poly(vinyledene fluoride), polyethylene-oxide and polypropylene-oxide, a lithium compound selected from the group consisting of lithium triflate, lithium perchlorate, lithium borofluoride, lithium arsenofluoride and lithium phosphofluoride, said organic polymer and said lithium compound being dispersed in a matrix selected from the group consisting of ethylene carbonate, propylene carbonate and mixtures thereof, said lithium compound being present in said second concentration.

13. A method for forming an electrode-electrolyte assembly for incorporation in a rechargeable lithium battery as claimed in claim 1, wherein said organic binder agglomerating said particles of fine carbon in said continuous layer, is selected from the group consisting of ethylene carbonate, propylene carbonate and mixtures thereof, and said lithium compound contained in said organic binder is one member of the group consisting of lithium triflate, lithium perchlorate, lithium borofluoride, lithium arsenofluoride and lithium phosphofluoride.

14. A method for forming an electrode-electrolyte assembly for incorporation in a rechargeable lithium battery as claimed in claim 2, wherein said organic binder agglomerating said fine particles of said oxide in said continuous layer, is selected from the group consisting of ethylene carbonate, propylene carbonate and mixtures thereof, and said lithium compound contained in said organic binder is one member of the group consisting of lithium triflate, lithium perchlorate, lithium borofluoride, lithium arsenofluoride and lithium phosphofluoride.

15. A method for forming an electrode-electrolyte assembly for incorporation in a rechargeable lithium battery as claimed in claim 1, wherein said continuous layer of agglomerated particles of fine carbon is embedded in a fourth polymer laminate having parallel faces.

16. A method for forming an electrode-electrolyte assembly for incorporation in a rechargeable lithium battery as claimed in claim 2, wherein said continuous layer of agglomerated fine particles of an oxide is embedded in a fourth polymer laminate having parallel faces.

17. A method for forming an electrode-electrolyte assembly for incorporation in a rechargeable lithium battery, comprising the steps of:

i) providing a first polymer laminate having embedded therein an electronically conductive carbonaceous substance, said first polymer laminate having parallel faces and being impervious to water, said first polymer laminate being permeable to electrons;

ii) agglomerating particles of fine carbon capable of intercalating lithium, with a lithium compound containing organic binder, and providing a continuous layer of the agglomerated particles of fine carbon so obtained on one of said parallel faces of said first polymer laminate, said continuous layer having thickness in excess of 0.5 mm, thereby forming a lithium containing negative electrode;

iii) providing a microporous polymer laminate separator having a pair of parallel faces, and impregnating an area of said microporous polymer laminate separator with an organic liquid containing a lithium compound in a first concentration, said lithium compound being capable of releasing lithium ions, said impregnated area of said microporous polymer laminate separator substantially corresponding to said agglomerated layer of particles of fine carbon located on one of the parallel faces of said first polymer laminate comprised in said lithium containing negative electrode, said microporous polymer laminate separator being non-conductive of electrons and lithium ions;

iv) providing a lithium ion containing fluid adhesive mixture and disposing said mixture to form a lithium ion containing adhesive coating on at least a portion of one of the parallel faces of said impregnated area of said microporous polymer laminate separator, said fluid adhesive mixture containing a lithium compound in a second concentration, said second lithium compound concentration being less than said first lithium compound concentration; and v) bringing into contact said lithium ion containing adhesive coating disposed on one of said parallel faces of said impregnated area of said microporous polymer laminate separator with said continuous layer of fine carbon agglomerated with a lithium compound containing organic binder located on one of said parallel faces of said first polymer laminate comprised in said lithium containing negative electrode, thereby forming a lithium containing electrode-electrolyte assembly adherent to one another.

18. A method for forming an electrode-electrolyte assembly for incorporation in a rechargeable lithium battery, comprising the steps of:

i) providing a first polymer laminate having embedded therein an electronically conductive carbonaceous substance, said first polymer laminate having parallel faces and being impervious to water, said first polymer laminate being permeable to electrons;

ii) agglomerating fine particles of an oxide capable of incorporating lithium, with a lithium compound containing organic binder, said oxide being selected from the group consisting of vanadium oxide, manganese oxide, cobalt oxide, nickel oxide and silver-vanadium oxide, and providing a continuous layer of the agglomerated fine particles of oxide so obtained on one of said parallel faces of said first polymer laminate, said continuous layer having thickness in excess of 0.5 mm, thereby forming a lithium containing positive electrode;

iii) providing a microporous polymer laminate separator having a pair of parallel faces, and impregnating an area of said microporous polymer laminate separator with an organic liquid containing a lithium compound in a first concentration, said lithium compound being capable of releasing lithium ions, said impregnated area of said microporous polymer laminate separator substantially corresponding to said agglomerated layer of fine particles of said oxide located on one of the parallel faces of said first polymer laminate comprised in said lithium containing positive electrode, said microporous polymer laminate separator being non-conductive of electrons and lithium ions;

iv) providing a lithium ion containing fluid adhesive mixture and disposing said mixture to form a lithium ion containing adhesive coating on at least a portion of one of the parallel faces of said impregnated area of said microporous polymer laminate separator, said fluid adhesive mixture containing a lithium compound in a second concentration, said second lithium compound concentration being less than said first lithium compound concentration; and v) bringing into contact said lithium ion containing adhesive coating disposed on one of said parallel faces of said impregnated area of said microporous polymer laminate separator with said continuous layer of fine particles of said oxide agglomerated with a lithium compound containing organic binder located on one of said parallel faces of said first polymer laminate comprised in said lithium containing positive electrode, thereby forming a lithium containing electrode-electrolyte assembly adherent to one another.

19. A method for forming an electrode-electrolyte assembly for incorporation in a rechargeable lithium battery as claimed in claim 17, wherein said microporous polymer laminate separator comprises a polymeric compound selected from the group consisting of polyethylene and polypropylene.

20. A method for forming an electrode-electrolyte assembly for incorporation in a rechargeable lithium battery as claimed in claim 18, wherein said microporous polymer laminate separator comprises a polymeric compound selected from the group consisting of polyethylene and polypropylene.

21. A method for forming an electrode-electrolyte assembly for incorporation in a rechargeable lithium battery as claimed in claim 17, wherein said organic liquid impregnating said microporous polymer laminate separator is selected from the group consisting of ethylene carbonate, propylene carbonate and mixtures thereof, and said lithium compound contained in said organic liquid impregnating said microporous polymer laminate is selected from the group consisting of lithium triflate, lithium perchlorate, lithium borofluoride, lithium phosphofluoride and lithium arsenofluoride.

22. A method for forming an electrode-electrolyte assembly for incorporation in a rechargeable lithium battery as claimed in claim 18, wherein said organic liquid impregnating said microporous polymer laminate separator is selected from the group consisting of ethylene carbonate, propylene carbonate and mixtures thereof, and said lithium compound contained in said organic liquid impregnating said microporous polymer laminate separator is selected from the group consisting of lithium triflate, lithium perchlorate, lithium borofluoride, lithium phosphofluoride and lithium arsenofluoride.

23. A method for forming an electrode-electrolyte assembly for incorporation in a rechargeable lithium battery as claimed 17, wherein said first concentration of said lithium compound in said organic liquid impregnating said microporous polymer laminate separator is less than 2 Molar.

24. A method for forming an electrode-electrolyte assembly for incorporation in a rechargeable lithium battery as claimed 18, wherein said first concentration of said lithium compound in said organic liquid impregnating said microporous polymer laminate separator is less than 2 Molar.

25. A method for forming an electrode-electrolyte assembly for incorporation in a rechargeable lithium battery as claimed in claim 17, wherein said coating of said fluid adhesive mixture containing a lithium compound is disposed on the entire face of one of said parallel faces of said impregnated area of said microporous polymer laminate separator corresponding to the entire face of said first polymer laminate comprised in said lithium containing negative electrode.

26. A method for forming an electrode-electrolyte assembly for incorporation in a rechargeable lithium battery as claimed in claim 18, wherein said coating of said fluid adhesive mixture containing a lithium compound is disposed on the entire face of one of said parallel faces of said impregnated area of said microporous polymer laminate separator corresponding to the entire face of said first polymer laminate comprised in said lithium containing positive electrode.

27. A method for forming an electrode-electrolyte assembly for incorporation in a rechargeable lithium battery as claimed in claim 17, wherein said fluid adhesive mixture containing a lithium compound comprises an organic polymer selected from the group consisting of ethylene propylene-diamine monomer, poly(vinylidene fluoride), polyethylene-oxide and polypropylene-oxide, a lithium compound selected from the group consisting of lithium triflate, lithium perchlorate, lithium borofluoride, lithium arsenofluoride and lithium phosphofluoride, said organic polymer and said lithium compound being dispersed in a matrix selected from the group consisting of ethylene carbonate, propylene carbonate and mixtures thereof, said lithium compound being present in said second concentration.

28. A method for forming an electrode-electrolyte assembly for incorporation in a rechargable lithium battery as claimed in claim 18, wherein said fluid adhesive mixture containing a lithium compound comprises an organic polymer selected from the group consisting of ethylene propylene-diamine monomer, poly(vinylidene fluoride), polyethylene-oxide and polypropylene-oxide, a lithium compound selected from the group consisting of lithium triflate, lithium perchlorate, lithium borofluoride, lithium arsenofluoride and lithium phosphofluoride, said organic polymer and said lithium compound being dispersed in a matrix selected from the group consisting of ethylene carbonate, propylene carbonate and mixtures thereof, said lithium compound being present in said second concentration.

29. A method for forming an electrode-electrolyte assembly for incorporation in a rechargeable lithium battery as claimed in claim 17, wherein said organic binder for agglomerating said particles of fine carbon in said continuous layer, is selected from the group consisting of ethylene carbonate, propylene carbonate and mixtures thereof, and said lithium compound contained in said organic binder is one member of the group consisting of lithium triflate, lithium perchlorate, lithium borofluoride, lithium arsenofluoride and lithium phosphofluoride.

30. A method for forming an electrode-electrolyte assembly for incorporation in a rechargeable lithium battery as claimed in claim 18, wherein said organic binder for agglomerating said fine particles of said oxide in said continuous layer, is selected from the group consisting of ethylene carbonate, propylene carbonate and mixtures thereof, and said lithium compound contained in said organic binder is one member of the group consisting of lithium triflate, lithium perchlorate, lithium borofluoride, lithium arsenofluoride and lithium phosphofluoride.

31. A method for forming an electrode-electrolyte assembly for incorporation in a rechargeable lithium battery as claimed in claim 17, wherein said continuous layer of agglomerated particles of fine carbon is embedded in a fourth polymer laminate having parallel faces.

32. A method for forming an electrode-electrolyte assembly for incorporation in a rechargeable lithium battery as claimed in claim 18, wherein said continuous layer of agglomerated fine particles of said oxide is embedded in a fourth polymer laminate having parallel faces.

* * * * *